United States Patent [19]

Hurley et al.

[11] 3,717,487
[45] Feb. 20, 1973

[54] CERAMIC SLIP COMPOSITION

[75] Inventors: Thomas P. Hurley, Pownal, Vt.; Arthur C. McAdams, Jr., Wichita Falls, Tex.

[73] Assignee: Sprague Electric Company, North Adams, Mass.

[22] Filed: June 17, 1970

[21] Appl. No.: 47,103

Related U.S. Application Data

[63] Continuation-in-part of Ser. No. 613,954, Feb. 3, 1967, abandoned.

[52] U.S. Cl...................106/48, 106/39 R, 106/311, 117/200, 264/61
[51] Int. Cl..............................................C03c 5/02
[58] Field of Search...106/39 R, 46, 48, 311; 29/580; 117/200; 264/61, 109, 63

[56] References Cited

UNITED STATES PATENTS

| | | | |
|---|---|---|---|
| 3,189,978 | 6/1965 | Stetson | 264/61 X |
| 2,966,719 | 1/1961 | Park | 264/63 X |
| 2,836,501 | 5/1958 | Crownoyer | 106/39 R |
| 3,125,618 | 3/1964 | Levinson | 106/39 R |
| 2,837,487 | 6/1958 | Huttar | 106/48 X |
| 3,540,894 | 11/1970 | McIntosh | 106/39 R |
| 3,551,197 | 12/1970 | Lindquist | 106/39 R |
| 3,558,332 | 1/1971 | Buchanan | 106/39 R |

OTHER PUBLICATIONS

Andrews, A. I.; Milling and Mill Additions, in Porcelain Enamels; Champaign, 1961 pp. 341–342.
Singer; F. et al.; Mechanical Preparation, in Industrial Ceramics, New York, 1963 p. 679.

*Primary Examiner*—L. Dewayne Rutledge
*Assistant Examiner*—W. R. Satterfield
*Attorney*—Connolly and Hutz and Vincent H. Sweeney

[57] ABSTRACT

A new ceramic slip and an improved method for forming ceramic films and ceramic capacitors by passing a flat substrate through a falling sheet of the novel ceramic slip so as to receive a thin, uniform film of the ceramic slip. The substrate is either re-passed through said falling sheet one or more times to build up the desired thickness, dried and fired to maturity or the film is dried and alternate electrode-ceramic layers built-up in well-known capacitor fashion.

7 Claims, 5 Drawing Figures

PATENTED FEB 20 1973 3,717,487
Fig. 1
PRIOR ART
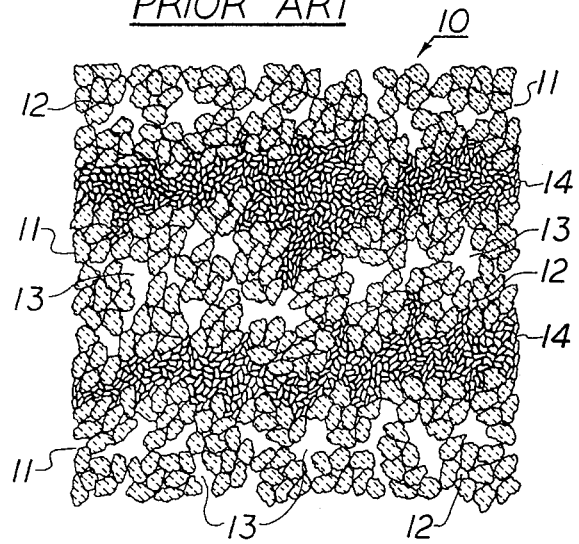
Fig. 2
PRIOR ART
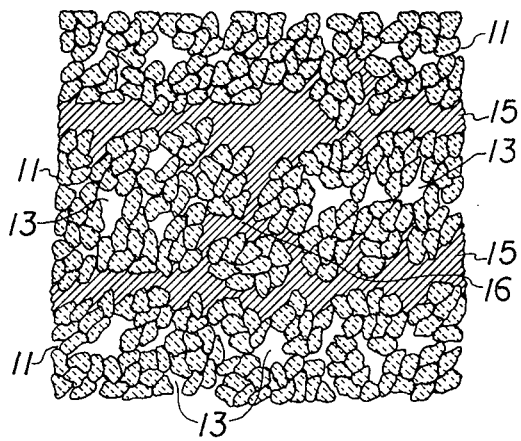
Fig. 3
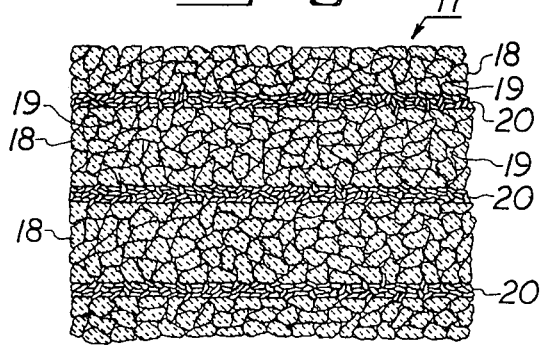
Fig. 4
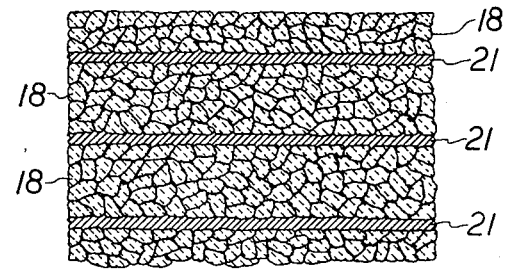
Fig. 5
MILL SLIP CONCENTRATE TO FINENESS OF GRIND OF 0-20µ → ADD BINDER AND DILUTE TO VISCOSITY OF 300-1500 cps. → OR → FOR CAPACITOR FORMATION CURTAIN COAT EMPLOYING A POROUS SUBSTRATE / FOR DIELECTRIC COMPACT FORMATION CURTAIN COAT EMPLOYING EITHER A POROUS OR NON-POROUS SUBSTRATE → THERMALLY REMOVE ORGANIC MATERIAL

CERAMIC SLIP COMPOSITION

CROSS-REFERENCE TO RELATED APPLICATION

This application is a continuation-in-part of application Ser. No. 613,954, filed Feb. 3, 1967 and later abandoned.

BACKGROUND OF THE INVENTION

This invention pertains to improvements in ceramic slip compositions and in curtain coating methods for forming ceramic films and ceramic capacitors.

Prior art ceramic films and ceramic capacitors have been plagued by the presence of non-uniform grain size and the presence of a plurality of air pockets. These characteristics contribute to low dielectric constant, wide variation in dielectric constant within a given ceramic piece and rapid degradation on life test. Another disadvantage of prior art processes is that they are slow. For example, one prior art process employs a doctor blade technique to apply a film of ceramic slip to a substrate. This technique and the comparatively high viscosity of the slip result in a rather slow process yielding non-uniform films. Spray-deposited films also can be quite porous and irregular. The prior art has always employed a rather haphazard technique of forming the ceramic slip concentrate, paying little attention to ultimate particle size, ratio of constituents and viscosity of the slip.

SUMMARY OF THE INVENTION

This invention relates to a new ceramic slip concentrate consisting essentially of a mixture of a powdered inorganic dielectric material, a non-aqueous vehicle and a deflocuating proportion of a dispersing agent, said mixture having been milled to a fineness of grind of from 0-20 microns as measured on a fineness of grind gage.

The invention also relates to an improved method for forming ceramic films and ceramic capacitors comprising: preparing the slip concentrate by mixing or combining powdered inorganic dielectric material, a non-aqueous vehicle and a deflocuating proportion of a dispersing agent; adjusting the viscosity of the concentrate so that at the completion of milling it will have a viscosity between 1,000–20,000 and preferably 6000–15,000 cps. as determined on a Brookfield Model LV viscosimeter with a No. 4 spindle operating at 30 rpm, milling the concentrate to a fineness of a grind of between 0–20 microns as shown on a fineness of grind gage. This gage reading will vary between 0–20 microns depending on the nature of the powdered material. Thereafter, adding organic binder (which is preferred but not required) and diluting the concentrate with more nonaqueous vehicle to form a mixture having a viscosity of from 300–1500 cps. as determined on a Brookfield Model LV viscosimeter with a No. 2 spindle. Passing a flat substrate through a falling sheet or curtain of said mixture so as to receive a thin uniform film of the mixture. Thereafter, the substrate is either (1) re-passed through said falling sheet one or more times to build up the desired thickness, dried to evaporate the solvent (after each pass or after sever passes), subdivided into individual pieces by cutting or die-cutting and fired to mature the ceramic, or (2) the film is dried and alternate electrode ceramic layers built up and subdivided into individual capacitors.

When the process is utilized to form multi-layered capacitors, the flat substrate must be a porous substrate. On the other hand, when subsequent coatings will be on undried or only partially dried previously deposited layers, the substrate need not be porous. The reason a porous substrate is necessary for the formation of multi-layered capacitors is because it is necessary to dry each ceramic layer so that a plurality of electrodes can be applied to the ceramic surface by means of a stencil, screen, or other means of printing or depositing the electrodes.

In the dried state the unfired ceramic layer consists of 50–75 percent by volume of ceramic, 0–25 percent by volume of resinous binder and the balance air in the form of homogeneously distributed micropores. A subsequent vehicle wet layer, placed over the top of this porous layer seals off the top of the dried layer. As solvent is "leached" out of the uppermost layer, the solvent will displace the air from the micropores of the dried layer. The air in the micropores must have a free path to travel downward. If it encounters a barrier to this free movement, i.e., a nonporous substrate, air will be trapped against the barrier and coalesce into larger pockets or voids. If these are large enough at the moment when the entire structure above them is a low viscosity liquid, then some air will rise to the surface or part way to the surface. If it reaches the surface it becomes a pinhole visible on the surface which extends down to a point either close to where it originally formed or to some point between the point of origin and the surface. The salient fact is that since dried layers contain substantial amounts of free air, the solvent-displaced air must have freedom to travel down into a porous substructure. The thickness of this porous substructure must be adequate to accommodate the amount of air being displaced at ambient atmospheric pressure. It is obvious that this porous substrate can be paper of many types, woven or unwoven cloth, a thick substrate of the unfired ceramic being used in the process, etc.

When placing subsequent layers on undried or partially dried previously deposited layers, the need for a porous substrate is negated. By this means many layers, indeed an indefinite number, can be built up. This would be the case in producing dielectric compacts similar to discs and plates conventionally made by dry pressing. Either technique (porous or nonporous substrate) can be used to make plain ceramic compacts, but when electrodes in capacitive patterns are applied by means of a spray through a stencil or mask, or silk screening techniques, a dry comparatively rigid structure is preferred, requiring a porous substrate.

By keeping the substrate heated to within 10° to 50°C below the vehicle boiling point, the process can turn out a far greater number of ceramic films in a given period of time than the doctor blade or spray-deposit process. Moreover, the fired ceramic films have a uniformity of grain size and an absence of grain clusters never before achieved by the prior art. The present process completely eliminates air pockets and pinholes in the unfired ceramic compact.

When the process is utilized to form multi-layered capacitors it is preferred that after the first ceramic layer is deposited and dried free of solvent and the first electrode coating is applied and dried, this combination must be maintained at a temperature high enough to expel the solvent of the next ceramic layer rapidly enough so that said solvent cannot disturb the integrity of the electrode coating. If the temperature is not sufficiently high, the solvent will disturb or disrupt the electrode coating which would result in discontinuous electrodes in the finished unit. This temperature range must be maintained for each succeeding ceramic-electrode build-up. For the preferred solvent system of the present invention the temperature range of between 50°C and just below the boiling point of the solvent is suitable. For 1 mil ceramic layers (fired thickness) a temperature range of 55°–65°C is sufficient, whereas for 2 mil layers 60°–80°C is suitable.

It is an object of the present invention to present a new ceramic slip concentrate.

It is another object of the present invention to provide a method for forming a comparatively dense ceramic body.

Another object is to provide a method for forming ceramic bodies which is more economical and faster than spray deposit or doctor blade methods for forming ceramic films.

Still another object is to provide a method for forming ceramic pieces having dielectric characteristics unattainable by existing procedures.

A further object of the invention is to provide a method for forming ceramic capacitors rapidly and economically.

A still further object is to provide a method for forming pinhole-free ceramic bodies.

BRIEF DESCRIPTION OF THE DRAWING

FIG. 1 of the drawing shows a prior art unfired ceramic capacitor 10, having layers of clusters of ceramic grains 11. The ceramic slip had not been milled to a fineness of grind from 0–20$\mu$ as required by the present invention. Within each cluster and between many of the grains of the cluster are micropores of air 12. Between clusters there are larger air pockets 13. Between the layers of clusters are the unfired electrode particles 14.

FIG. 2 depicts FIG. 1 after it has been fired to maturity. The electrode particles, upon sintering, consolidate to form extremely irregular but continuous electrodes 15. During sintering the micropores of individual ceramic clusters become even smaller and are not shown herein. The larger air pockets 13 between clusters, though somewhat reduced in size, still remain. In fact 16 illustrates a point between two electrodes which had been a pinhole filled with electrode material and remained a short between the electrodes after sintering.

FIG. 3 illustrates an unfired capacitor 17 of the present invention. The ceramic slip employed had been milled to a fineness of grind of from 0–20$\mu$. The unfired ceramic layers consist of well-packed particles 18. Homogeneously distributed between the particles are micropores of air 19. The electrode particles 20 form thin, regular layers between the unfired ceramic layers. There are no large air pockets in the structure.

FIG. 4 depicts FIG. 3 after it had been fired to maturity. The electrode particles, upon sintering, consolidate to form thin, continuous, regular electrodes 21. During sintering the micropores in the ceramic dielectric essentially disappeared and are not shown herein. The ceramic layers are dense, regular and free of air pockets.

FIG. 5 shows a flow diagram of the process of the present invention.

DETAILED DESCRIPTION OF THE INVENTION

The ceramic slip concentrate has the following preferred proportions and characteristics: a mixture consisting essentially of:
  a. 7–9.5 parts by weight of inorganic dielectric material;
  b. 1–3 parts by weight of a nonaqueous vehicle; and
  c. a dispersing proportion of a dispersing agent; said mixture having been milled to a fineness of grind from 0–20 microns as measured on a fineness of grind gage.

The final ceramic slip is formulated by adding a binding proportion of an organic binder to the concentrate and adding more nonaqueous vehicle to form a mixture having a viscosity between 300–1500 cps.

The inorganic material may be any prior art ceramic material, e.g., the titanates, zirconates, niobates, alumina, porcelain, ferrites, etc. Preferred materials for capacitors are barium titanates, i.e., barium titanate and prior art modified barium titanates. Preferred materials for substrates used for hybrid thick and thin-film electronic circuits are alumina and titanates. The nonaqueous vehicle can be any one of a variety of organic vehicles, such as turpentine, xylene, amyl acetate, paint thinners, benzene, toluene, esters, ethers, alcohols, pine oil, etc. and mixtures thereof. A preferred vehicle is a mixture of 0 to 10 parts of xylene to 0 to 10 parts of amyl acetate.

The dispersing or deflocculating agents contemplated are those materials which will effectively cause the ceramic material to remain uniformly dispersed in the nonaqueous vehicle with at least a substantial absence of agglomerates or particle clusters. Included among the contemplated dispersing agents are polyethylene glycols, lecithin (e.g., soybean lecithin), polyoxyethylene isooctylphenyl ether, polyoxyethylene nonylphenyl ether. For most mixtures a dispersing proportion will fall within the range of 0.2 to 3.0 parts by weight of the mixture.

The binder material can be any one or a mixture of prior art binder materials e.g., polystyrene, hydrogenated rosin, polymethacrylates, such as polymethyl, polyethyl, or polybutylmethacrylates mixtures or copolymers thereof. For most mixtures a binding proportion will fall within the range of 0.2–5.0 parts by weight of the solids.

EXAMPLE I

A mixture of 89 percent by weight of a commercial BaTiO$_3$, (average grain size 1.8$\mu$ as determined by Fisher sub sieve sizer) 9.5 percent by weight of a 7:3 weight ratio mixture of xylene and amyl acetate and 1.5 percent of soybean lecithin was pre-mixed together and then ball milled to a fineness of grind of 7.5$\mu$ as measured on a Precision Gage and Tool Company fineness of grind gage, catalogue No. 625 1/2–MU (Dayton, O.). This gage is calibrated from 0 to 12 ½ in ½ micron increments. After adding a binding proportion of butylmethacrylate the mixture was then diluted with additional 7:3 mixture of xylene and amyl acetate to a viscosity of 600 cps.

In a continuous cycle the mixture was pumped into a pouring head, discharged as a continuous, uniform, falling sheet and re-pumped into the pouring head. A flat substrate was passed through the falling sheet a number of times to build up a film about 2–50 mils thick. The film was then dried and fired to maturity.

The mature ceramic piece is completely free of air pockets. The complete absence of pinholes will result in a more stable performance when the ceramic is used in electrical components and microcircuits. The lack of air holes and the efficiently packed ceramic grains means greater dielectric density.

EXAMPLE II

A mixture of 89 percent by weight of chemically pure $BaTiO_3$, having a particle size substantially less than 1 micron, is pre-mixed with about 9.5 percent by weight of a 7:3 weight ratio mixture of xylene and amyl acetate and about 1.5 percent by weight of polyoxyethylene isooctylphenyl ether. While the particle size of the $BaTiO_3$ is less than 1 micron, the particles tend to agglomerate into clusters of from 50–500 microns in size. These agglomerates must be broken up and the particles effectively dispersed throughout the liquid medium. This is accomplished, after pre-mixing, by ball milling the mixture until a fineness of grind reading of less than $2\mu$ is obtained on the gage of Example I. After adding a binding proportion of a commercially available hydrogenated rosin binder, the milled concentrate is then diluted to a viscosity of about 600 centipoise with additional 7:3 mixture of xylene and amyl acetate.

In a continuous cycle, the mixture is pumped into a pouring head, discharged as a continuous, uniform, falling sheet and repumped into the pouring head. A flat substrate having a porous cover paper is passed through the falling sheet so as to receive a film of the uniform mixture. The substrate is passed through the falling sheet a number of times, drying each new layer, to build up a film of about 2–50 mils thick. The film is then removed from the paper and fired to maturity. The mature ceramic piece of this example is very dense and completely free of air pockets.

EXAMPLE III 86 percent by weight of alumina, having a particle size of about 2 microns, is pre-mixed with 13 percent by weight of xylene ad 1 percent by weight of lecithin as a dispersing agent. This combination is then ball milled until a fineness of grind reading of less than $3\mu$ is obtained n the gage of Example I. After adding a 5 percent by weight of solids of hydrogenated rosin as a binder, the milled concentrate is then diluted to a viscosity of about 1000 centipoise with additional xylene.

As in Example II, this mixture is pumped into a pouring head, discharged as a continuous uniform falling sheet and re-pumped into the pouring head. A flat substrate, having a porous cover paper is passed through the falling sheet so as to receive a film of the uniform mixture. The substrate is passed through the falling sheet a number of times, drying each new layer, to build up a film 30 mils thick. The film is removed from the paper and fired to maturity. The mature alumina piece is extremely dense, strong and completely free of air pockets.

EXAMPLE IV

The mixture of Example II is employed to form a plurality of monolithic electrical capacitors. A flat substrate having a porous paper cover layer is passed through a continuously falling sheet of the mixture of Example II. The substrate is re-passed through the sheet until a build-up of 1–2 mils is obtained. The build-up is then dried to remove the organic vehicle. A plurality of palladium electrodes is silk screened onto the surface of the green ceramic layer. This process is repeated until the build-up contains 11 ceramic layers and 12 palladium patterns in capacitive arrangement. During the application of each succeeding ceramic layer the build-up is maintained at a temperature of between about 55°–80°C to facilitate removal of the solvent from each layer applied. The final build-up is diced into individual capacitor units. These units are then fired to maturity. An electrode pick-up of silver is applied to the exposed electrodes and leads are soldered thereto. Electrical measurements show a capacitance increase per volume of 5–25 percent over typical spray-deposited units of the same design.

The same process carried out without the use of a porous substrate resulted in capacitors having a multitude of voids and pinholes.

In another embodiment, electrodes can be deposited by continuously circulating a dispersion of metal powder in a falling sheet and passing through said falling sheet the deposited, preferably dry, ceramic layer covered with an appropriate mask or stencil. Open areas in the stencil permit the electrode metal-liquid dispersion to contact the ceramic in defined areas. After removal of the mask or stencil the electrode coating must be dried before the next ceramic layer is applied.

Examples of metal powder electrode dispersions — pts. by wt.

1. Palladium (or platinum, silver, nickel, gold, etc.) - 10–60
2. Binder (ethylcellulose, poly-styrene, etc.) — 1–10
3. Solvent (turpentine, pine oil, terpineol, diethylene glycol monobutyl ether, ethylene glycol monobutyl ether acetate, etc. or mixtures of solvents.) — 40–90

FIGS. 1 and 2 of the drawing illustrate a cross sectional segment of a capacitor formed of a ceramic slip which had not been milled to a fineness of grind of from $0-20\mu$ as required by the present invention. Moreover, the drawing is illustrative of a unit formed by spray-deposit techniques rather than formed by the present curtain coating method.

FIGS. 3 and 4 of the drawing illustrate a cross sectional segment of a capacitor representative of those formed by the process of Example IV. The ceramic layers are completely free of air pockets or pinholes and the ceramic grains are packed to the optimum degree. The electrodes are thin, continuous and regular. The electrode materials preferred herein are silver, the platinum group materials and alloys thereof.

FIG. 5 describes by a flow diagram the essential steps concerning the deposit of the ceramic slip. The slip concentrate must first be formulated according to the composition of the present invention and then be milled to the specified fineness of grind. Thereafter, a binder is added and the concentrate diluted to within the defined viscosity range. The slip is then of the proper character to be employed in a curtain coating apparatus. For dielectric compact formation, after each pass through the coating curtain, the resulting layer may be dried or it may be dried only once after a plurality of passes. For capacitor formation, if masking means is to come in contact with a ceramic layer, it is necessary, prior to the deposit of each electrode pattern, that the ceramic layers be dried. The electrodes of the unfired units must be quite porous and offer no obstruction to the traverse of the displaced air.

The evaporation of the nonaqueous vehicle from the various layers is facilitated by the use of a heated substrate, e.g., a ⅛ inch glass substrate heated at 110°C. This permits very rapid recycle and a quicker build-up of layers. The ceramic build-up or the capacitor build-up can be scribed with a cutting edge either part way through or all the way through the unfired body. The bodies can be broken apart at the scribe lines either before or after firing.

While the Examples have shown the substrate being passed through the falling sheet of the ceramic-solvent mixture a number of times to build up a ceramic layer, it is to be understood that this may be accomplished by a single pass by adjusting the speed of the substrate traverse through the sheet and the flow rate of the falling sheet of ceramic dispersion.

It should be apparent that the number and dimensions of the individual layers are in no way limited except by practical considerations. The thickness of the capacitor chips cut from the build-up is likewise not limited. The physical size and capacitance desired in each unit will dictate the dimensions of the layers and the thickness of the capacitor chips.

Since it is obvious that many changes and modifications can be made in the above-described details without departing from the spirit and nature of the invention, it is to be understood that the invention is not limited to said details except as set forth in the appended claims.

What is claimed is:

1. A ceramic slip concentrate consisting essentially of a mixture having a Brookfield viscosity between 6000 – 15000 cps. of:
    a. 70 to 95 percent by weight of a powdered inorganic dielectric material selected from the group consisting of a titanate, a zirconate, a niobate, alumina, porcelain and a ferrite;
    b. 10–30 percent by weight of a nonaqueous vehicle selected from the group consisting of xylene, amyl acetate and mixtures thereof; and
    c. a dispersing proportion of 0.2–3 percent by weight of a dispersing agent selected from the group consisting of polyethylene glycols, lecithin, polyoxyethylene isooctylphenyl ether, and polyoxyethylene nonylphenyl ether; said mixture having been milled to a fineness of grind of from 0–20 microns as measured on a fineness of grind gage.

2. The ceramic slip concentrate of claim 1 containing a binding proportion of 0.2 to 5 percent by weight of an organic binder selected from the group consisting of polystyrene, hydrogenated rosin, polymethacrylates, polybutylmethacrylates mixtures and copolymers thereof and additional nonaqueous vehicle to dilute the milled concentrate to form a mixture having a Brookfield viscosity between 300–1500 cps.

3. The ceramic slip of claim 1 wherein the vehicle consists of 70 percent xylene and 30 percent amyl acetate.

4. The ceramic slip of claim 3 wherein the dielectric material is a titanate.

5. The ceramic slip of claim 4 wherein the dispersing agent is lecithin and the binder is butylmethacrylate.

6. The ceramic slip of claim 1 wherein the dielectric material is alumina.

7. The ceramic slip of claim 6 wherein the dispersing agent is lecithin and the binder is butylmethacrylate.

* * * * *

UNITED STATES PATENT OFFICE
CERTIFICATE OF CORRECTION

PATENT NO. : 3,717,487
DATED : February 20, 1973
INVENTOR(S) : Thomas P. Hurley and Arthur C. McAdams, Jr.

It is certified that error appears in the above-identified patent and that said Letters Patent are hereby corrected as shown below:

Column 1, line 64, change "sever" to -- several --

Column 5, line 49, change "ad" to -- and --

Claim 1, line 3, (Col. 8, line 6) after "cps." insert -- as determined on a Brookfield Model LV viscosimeter with a No. 4 spindle, operating at 30 rpm, --

Claim 2, line 4, (Col. 8, line 24) after "polymethacrylates" delete the comma and insert -- such as polymethyl, polyethyl, or --

Claim 4, line 1, (Col. 8, line 32) change "claim 3" to -- claim 2 --

Claim 6, line 1, (Col. 8, line 36) change "claim 1" to -- claim 2 --

Signed and Sealed this twenty-first Day of October 1975

[SEAL]

Attest:

RUTH C. MASON
Attesting Officer

C. MARSHALL DANN
Commissioner of Patents and Trademarks